United States Patent Office 3,433,324
Patented Mar. 18, 1969

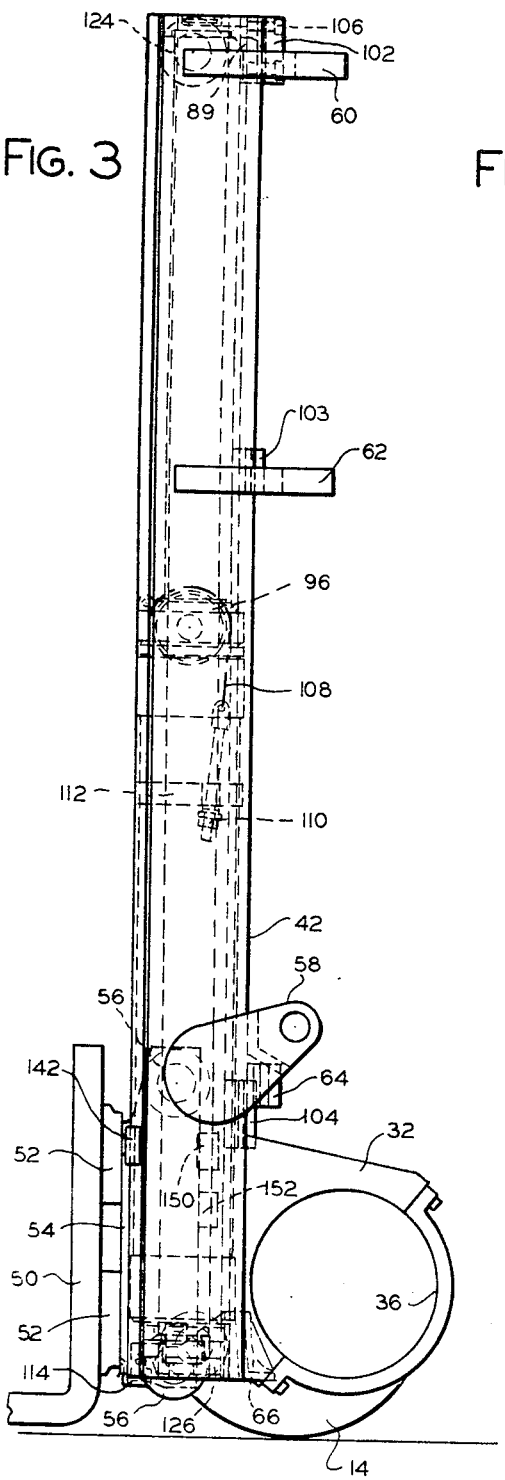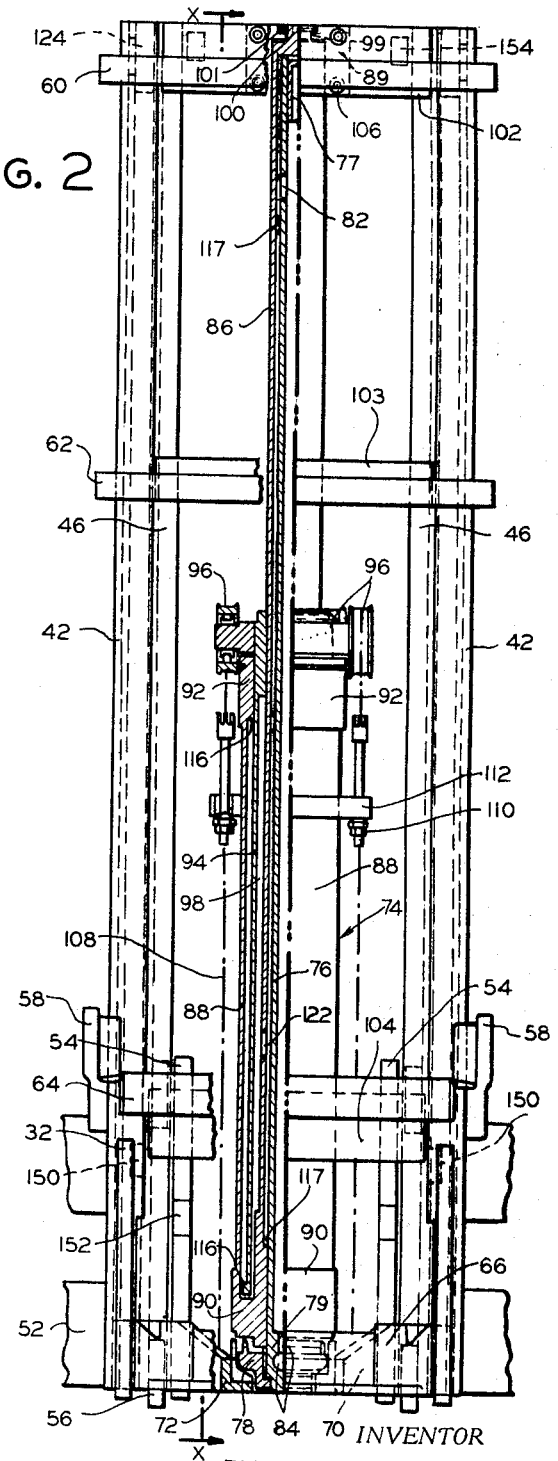

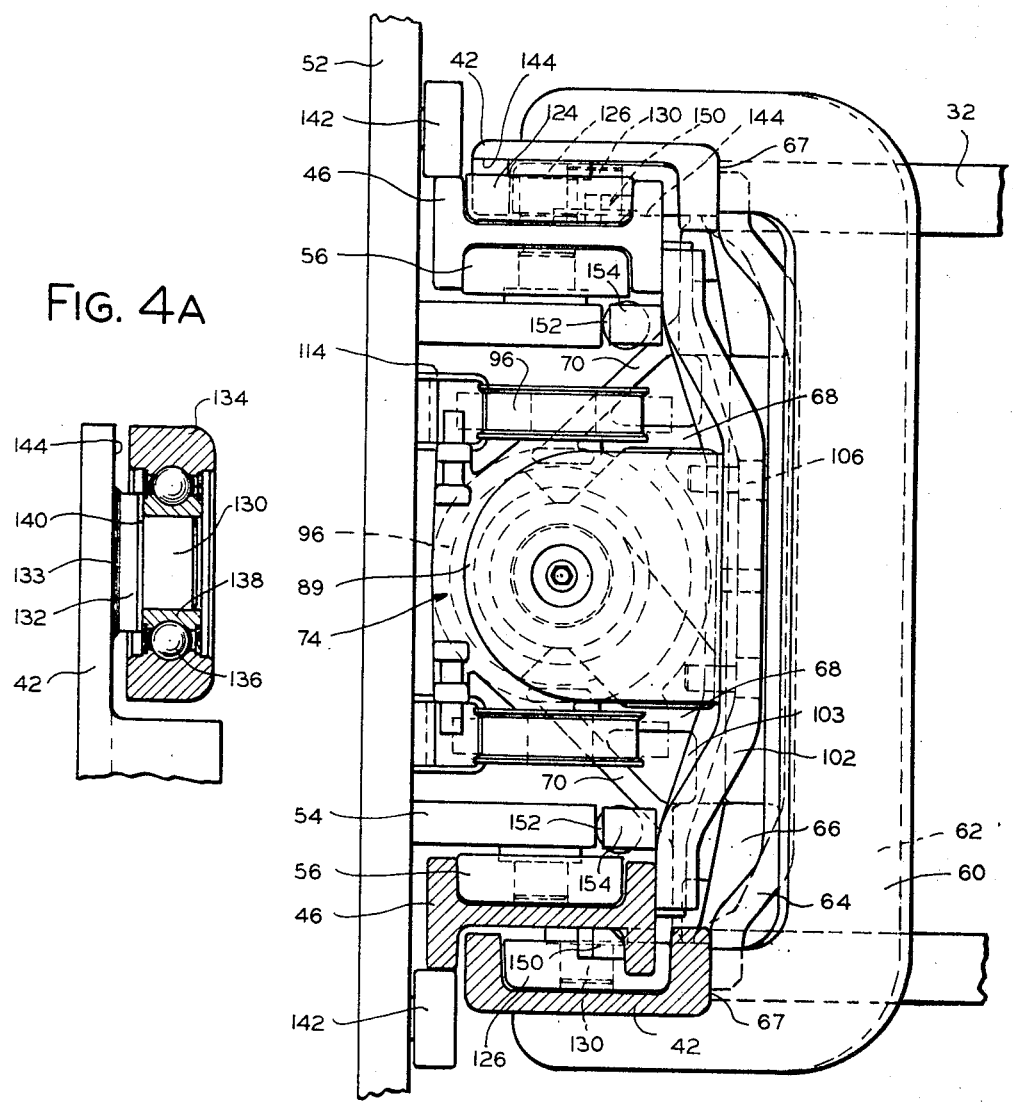

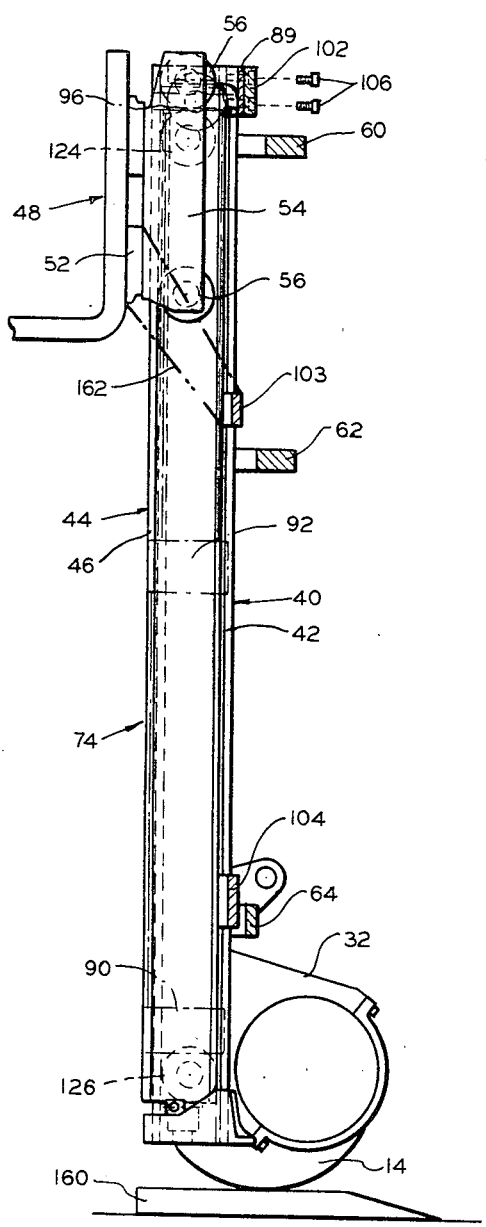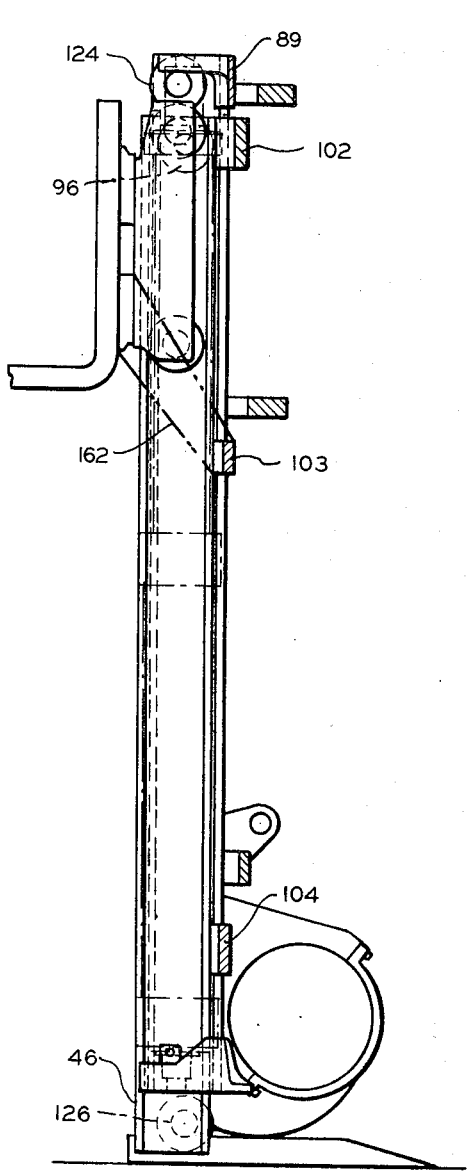

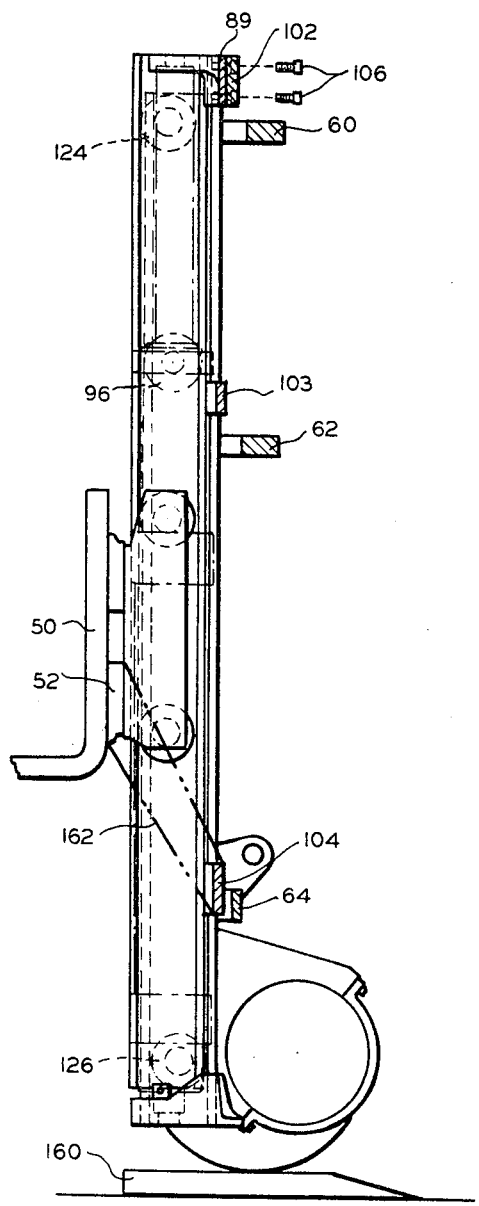
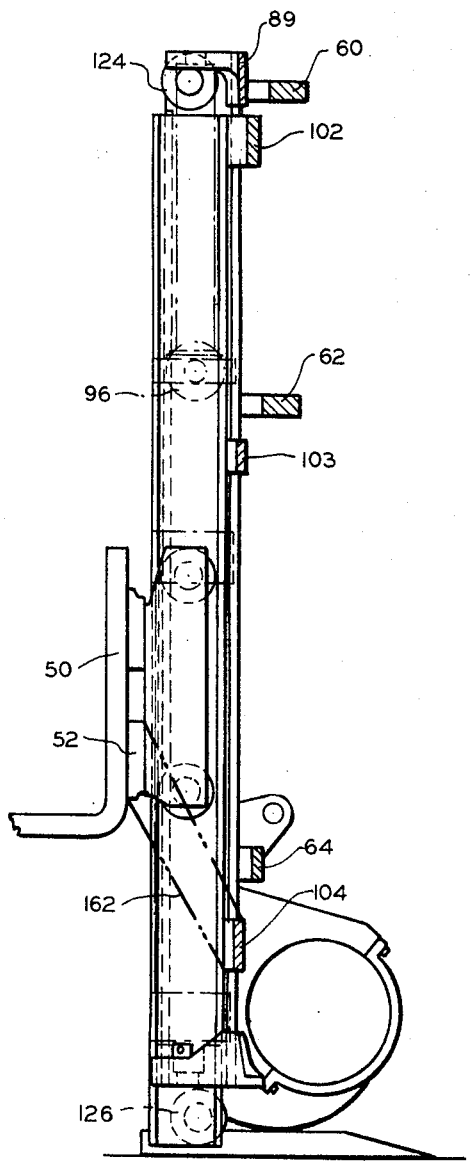

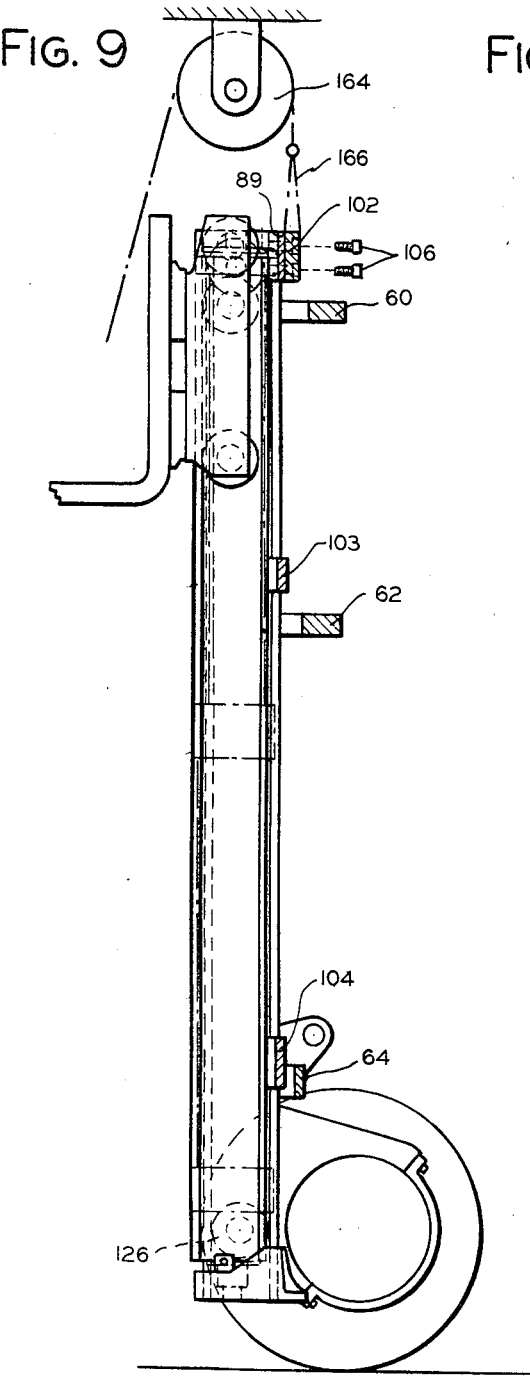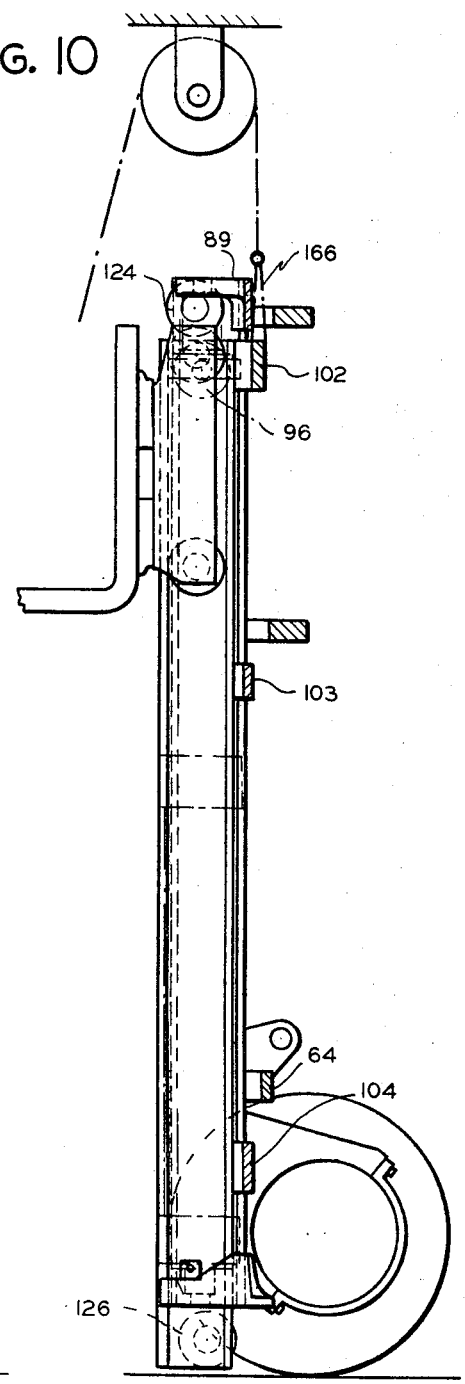

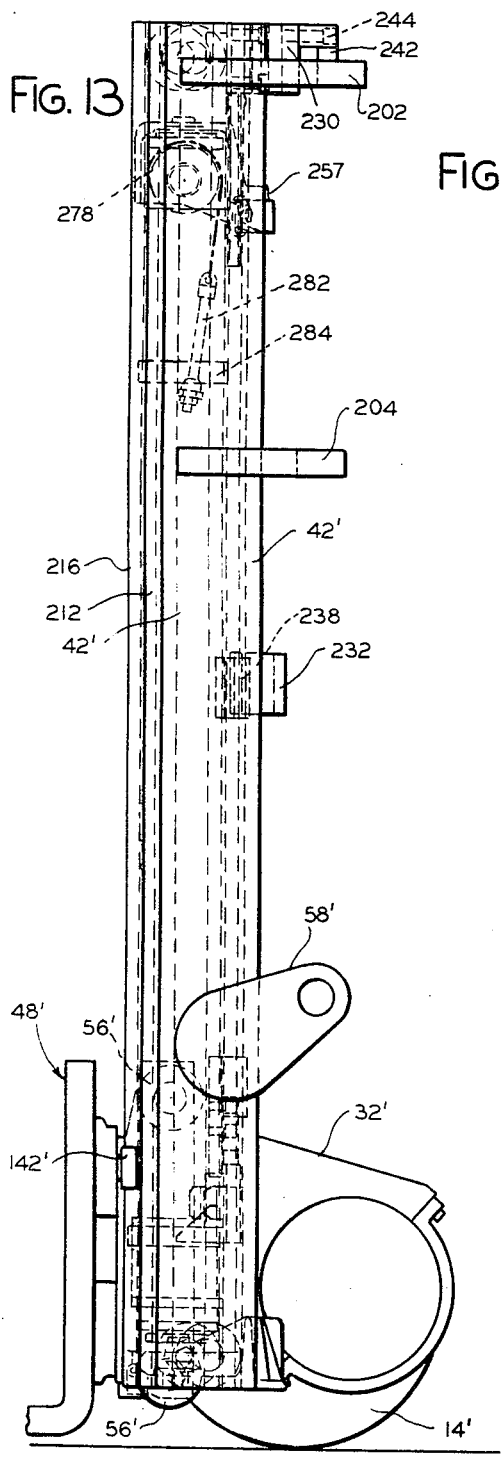
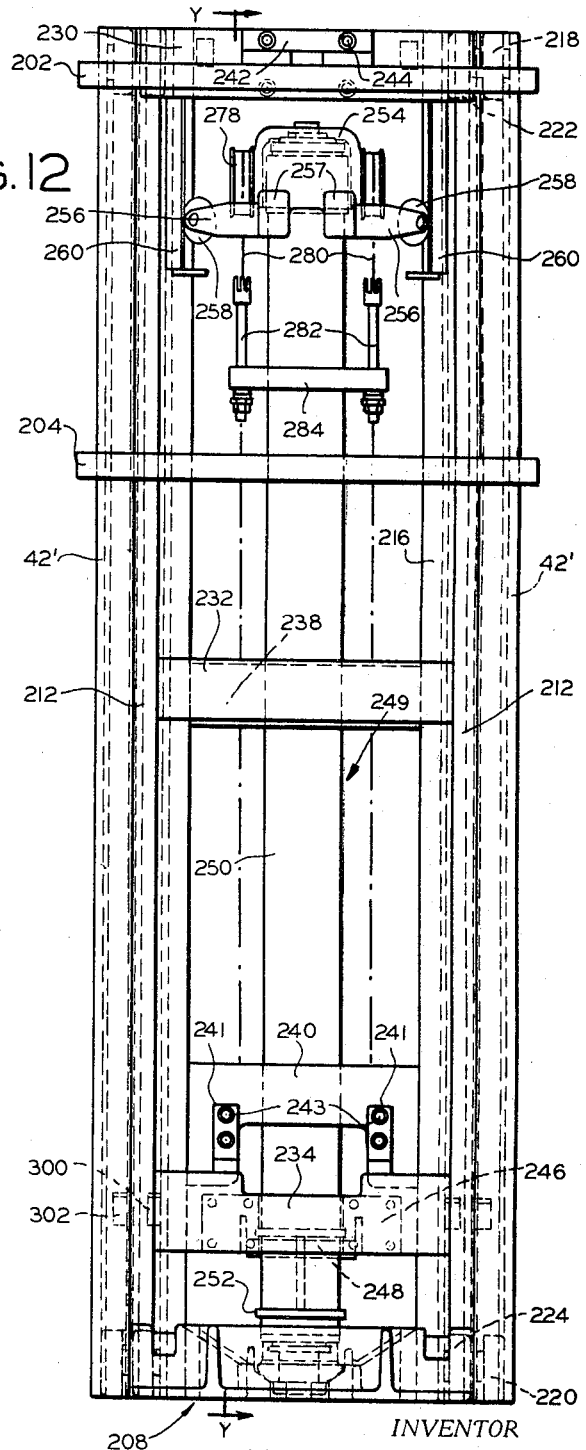

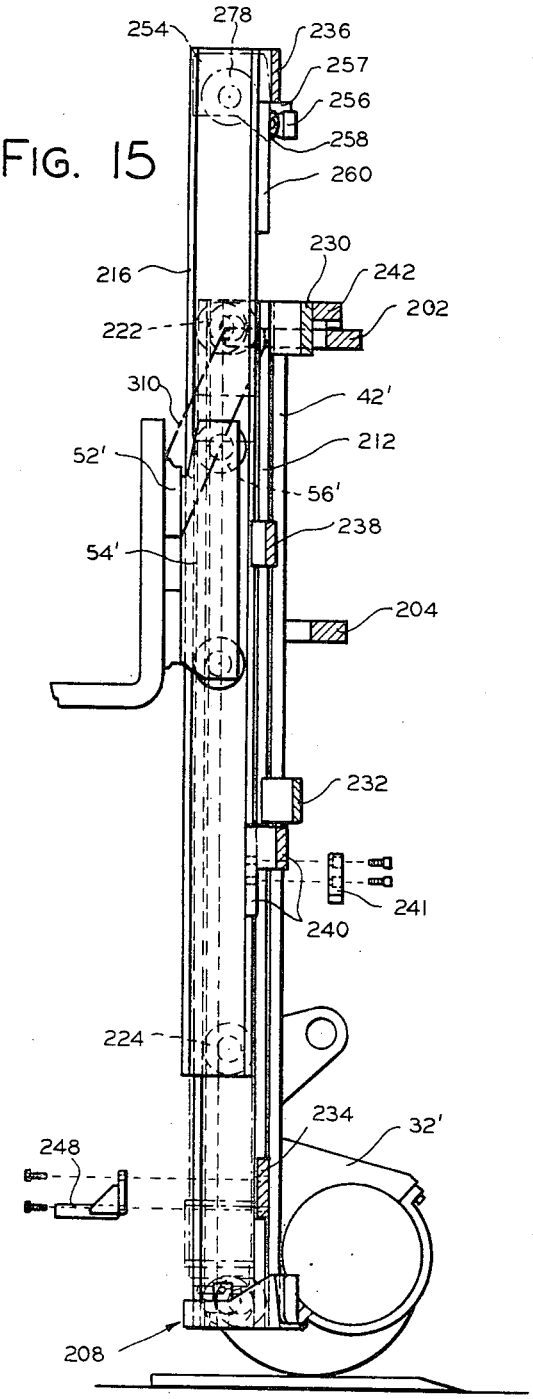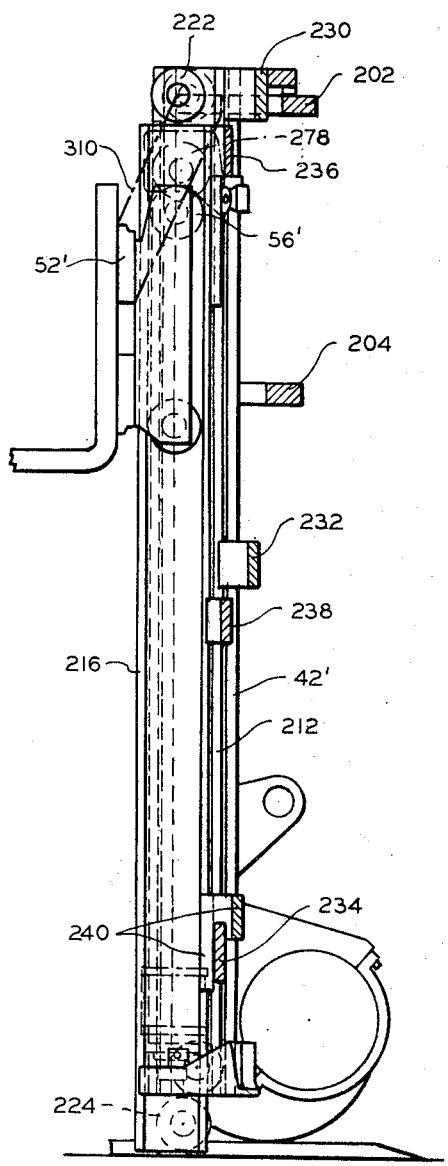

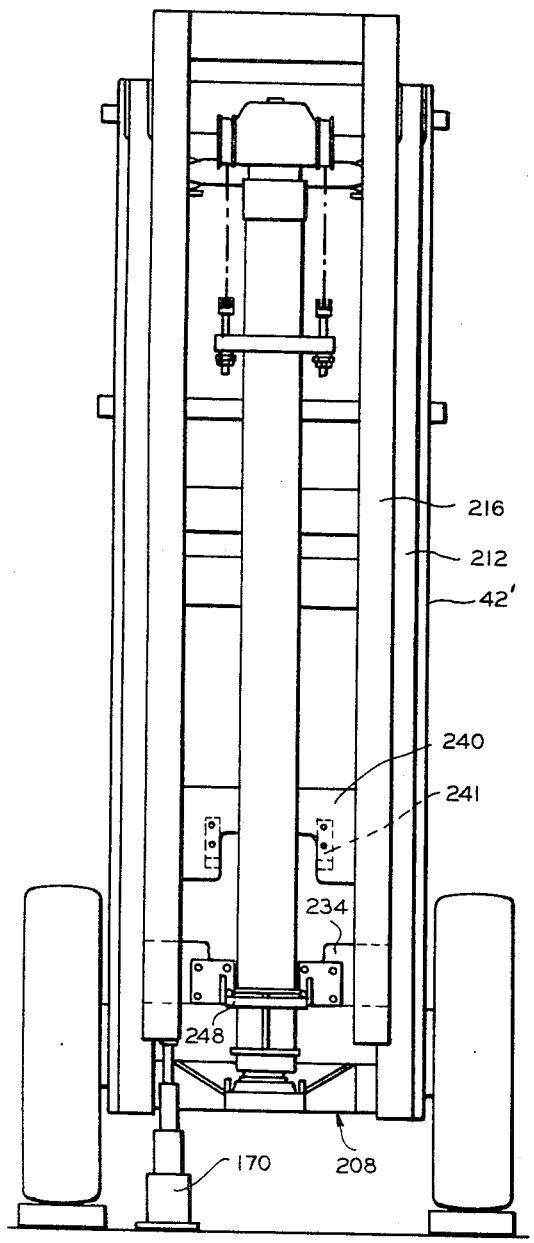
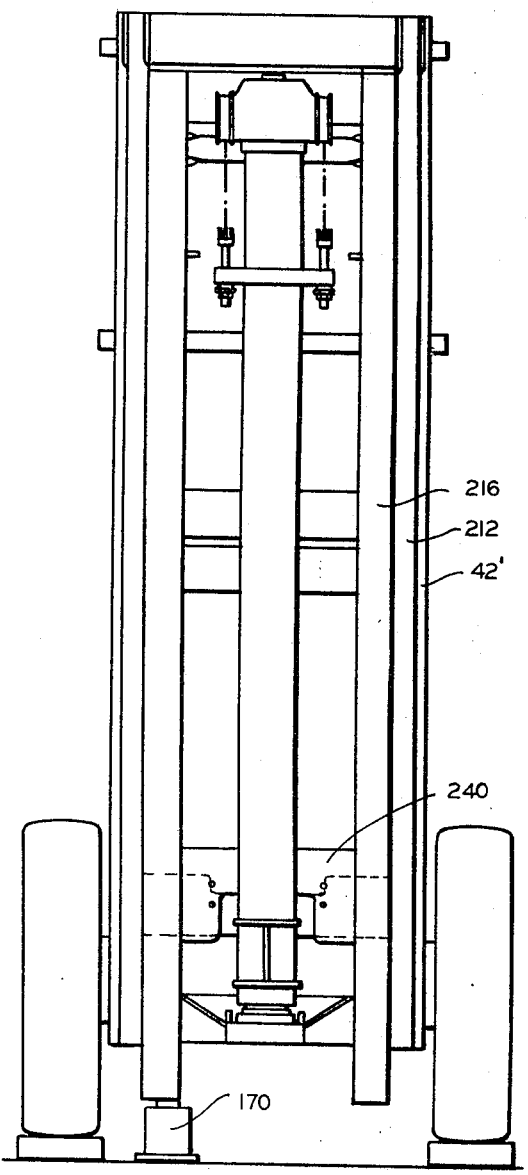

3,433,324
METHOD AND MEANS FOR ADJUSTING AND ASSEMBLING LIFT TRUCK UPRIGHTS
Richard F. McIntosh, Battle Creek, Mich., assignor to Clark Equipment Company, a corporation of Michigan
Filed Aug. 21, 1967, Ser. No. 662,170
U.S. Cl. 187—9     26 Claims
Int. Cl. B66b 9/20, 7/02

ABSTRACT OF THE DISCLOSURE

A lift truck roller mounted extensible mast which includes one or more removable stop and/or connecting means operably located between two or more mast rail sections and/or a mast rail section and the lifting motor means. The mast or rail sections and stops or connecting means are manipulatable and constructed so as to provide an improved structure and method for assembling the mast sections with the guide rollers being mountable thereon subsequent to assembly of the mast sections, and an improved method for adjusting and/or replacing any or all of the guide rollers subsequent to assembly of the mast sections and without disassembling the mast sections one from the other.

Background of the invention

The field of art to which the invention pertains includes elevators, and more specifically portable elevators.

It has long been a problem in the art to which this invention pertains to construct a roller mounted extensible type mast for lift trucks which provides both a sound and safe construction of reasonable cost, and is also capable of being serviced in a relatively short time with little inconvenience, particularly as regards ready adjustment or replacement of the guide rollers which support each extensible rail section from the next outer rail section. The problem is multiplied as masts become more complex in design, particularly as the number of stages of rail sections increase, e.g., a two-stage mast as compared with a triple-stage mast.

Heretofore it has been common to construct lift truck roller mounted masts such that to adjust or replace the guide rollers on a rail section of the mast it has been necessary either to first completely disassemble the rail sections one from the other, thereby necessitating special equipment such as overhead or truck cranes, or chain falls and the like, or to use relatively expensive threaded or otherwise constructed removable roller shafts to enable the rollers to be adjusted or replaced without complete disassembly of the rail sections.

One well-known manner of mounting extensible sections is to mount the rollers all on the inner extensible supported section, with no rollers mounted on the next outer rail section. A two-stage mast construction of this type is shown, for example, in Johnson Patent 2,321,029 wherein guide rollers are all mounted from the webs of the extensible rail section for supporting it in the outer fixed mast section. In the Johnson patent only two such guide rollers are mounted from each side of the extensible mast section, although in other similar constructions three or more such rollers have been mounted from each side of the extensible section at predetermined vertically spaced intervals; similarly, in exemplary Patent 2,759,562. One of the disadvantages of such a construction is the necessity of completely disassembling the rail sections one from the other in order to adjust or replace the rollers. The above-mentioned patents each utilizes a lower plate member secured across the bottom of the outer channels of the primary or fixed mast section in order to prevent the extensible mast section from being lowered below the outer mast section. Most commonly, overlapping rigidifying cross-brace members or tie-bars between the respective mast sections are used which overlap in such a manner as to prevent downward movement of the extensible rail sections below the lowermost position of the next outer section, such as shown in Patent 3,321,047. As also shown in the latter patent, the aforementioned problem is attempted to be alleviated by the special upright construction which involves the use of a longer extensible mast section than the fixed mast section so that the extensible section extends above the upper ends of the stationary section when fully lowered, guide rollers being mounted from the top edge portion of the fixed section enabling at least the latter guide rollers to be more readily replaced and serviced.

Another solution to the problem is disclosed and claimed in Patent 3,213,967 wherein guide rollers are mounted on shafts secured adjacent the top and bottom of the outer and inner rail sections, respectively, with the inner extensible I-beam rail sections nested in interlocking relation with intermediate I-beam sections of a triple-stage upright therein disclosed, the respective flanges of which are cut away at the upper front end of the intermediate section and at the lower rear end of the inner section so that the respective rollers can bypass one another through the respective flange cutouts in assembling and disassembling the mast sections. This permits the guide rollers and shafts to be preassembled and secured to the rails while also enabling the use of relatively low cost roller shafts which may be welded to the webs of the rails. However, while the latter arrangement has proven satisfactory in commercial use there remains the disadvantage of having to disassemble the rail sections in order to replace or adjust the guide rollers. Again, overlapping tie-bars or transverse brace plates between the sides of the rail sections prevent lowering any of the extensible rail sections below the lowermost position of the next outer section.

Summary

My invention is capable of a number of different embodiments or forms. Basically it provides a mast construction having multiple rail sections of two or three or more stages in which major mast components such as the rail sections and the lift cylinder are manipulatable in accordance with one or more methods which allow installation, adjustment and replacement of the guide rollers after the upright is fully assembled and without the need for extraneous equipment, such as a crane or the like, to disassemble the rail sections one from another. It is immaterial whether the guide roller shafts are constructed to be removable from the respective webs or are welded in position, although, of course, weldments comprise a lower cost means of attachment. In carrying out my invention I have conceived various methods for manipulating the upright components involved, all of which methods result in enabling the inner rail section of a two-stage upright to be lowered below the outer supporting rail section so as to expose both upper and lower guide rollers for installation, adjustment or replacement, as aforesaid, and in a triple-stage upright to successively expose the various pairs of upper and lower rollers by alternately lowering the inner and intermediate rail sections to negative lift positions. The structure and various methods for accomplishing this result will appear in detail below.

It is therefore a primary object of the invention to provide methods and means for enabling guide rollers in various types of lift truck uprights to be serviced with minimum "down time" and with relative ease, and without requiring disassembly of the upright.

Brief description of the drawing

FIGURE 2 is an enlarged elevational rear view of the mast shown in FIG. 1, and shows in partial section the telescopic lift ram motor;

FIGURE 3 is a side view in elevation of the mast of FIG. 2;

FIGURE 4 is an enlarged plan view in partial section of the mast of FIG. 2;

FIGURE 4A is a sectional view of one of the guide roller and shaft assemblies of the mast;

FIGURES 5 and 6 are somewhat schematized vertical side sectional views taken along line x—x of FIG. 2 with the lift ram shown in broken lines to illustrate one method of manipulating the mast for servicing the guide rollers;

FIGURES 7 and 8 are views similar to FIGS. 5 and 6, but show another method of manipulating the mast;

FIGURES 9 and 10 are similar to FIGS. 5 and 6, but show a third method of manipulating the mast;

FIGURE 12 is an enlarged elevational rear view of the mast shown in FIG. 11;

FIGURE 13 is a side view in elevation of the mast of FIG. 12;

FIGURES 15, 16, 17 and 18 are somewhat schematized vertical side sectional views taken along line y—y of FIG. 12 with the lift ram motor shown in broken lines and showing one embodiment of a method of manipulating various of the components of the mast of FIGS. 11–14 for exposing the pairs of guide rollers between the various rail sections for servicing; and FIGURES 19 and 20 are somewhat schematized front elevational views of the triple-stage upright of FIG. 12 showing exemplary steps of another method for exposing guide roller.

Description of the preferred embodiment

Figure 1:
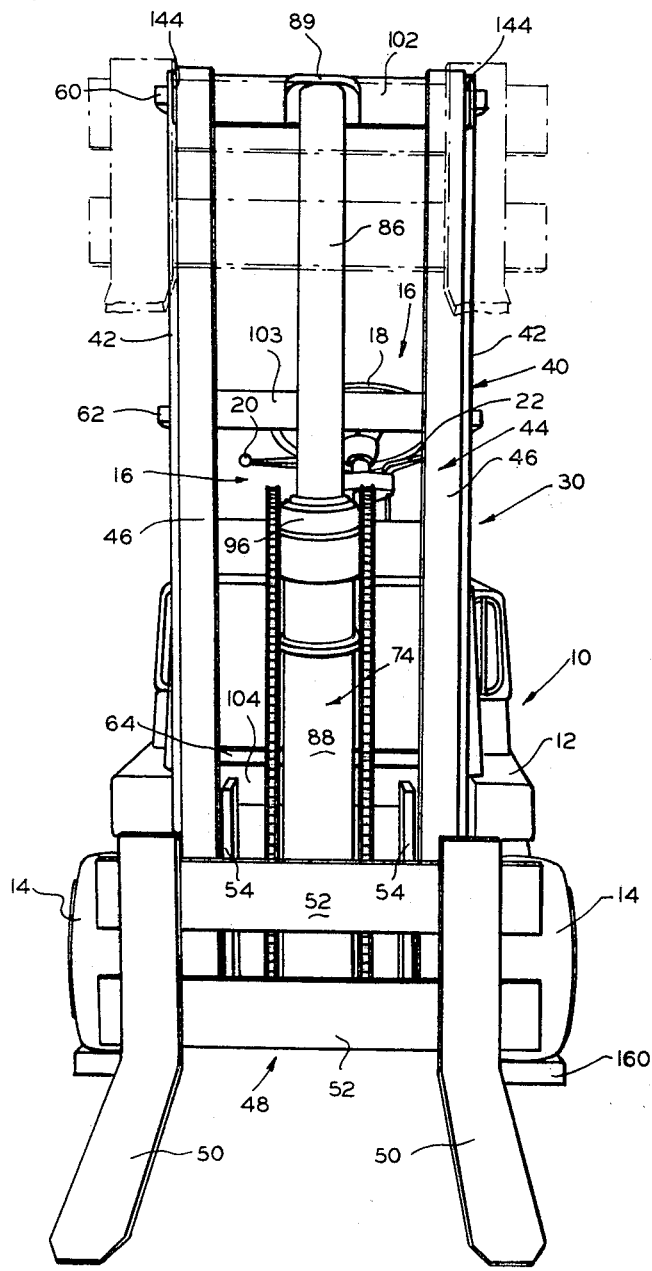
FIGURE 1 is a front view of a lift truck having mounted thereon a mast which embodies my invention.

Referring to FIGS. 1–4, a conventional industrial lift truck is shown at numeral 10 having a frame and body construction 12 mounted on a pair of steering wheels, not shown, at the rear end thereof and a pair of traction wheels 14 forwardly thereof. The truck embodies suitable electric or internal combustion prime mover means and drive line components for operating the truck from an operator's compartment 16, which includes an operator's seat mounted above the engine compartment, operator's foot controls, such as accelerator pedal and brake, not shown, and a plurality of hand controls and instrumentation some of which can be seen through the upright including a steering wheel 18, a control lever 20 for operating the upright, and a power train control lever 22 on the steering post.

The upright assembly of the present invention is illustrated generally at numeral 30, it being mounted on the truck by means of a pair of rearwardly extending support or trunnion plates 32 of the upright assembly which are adapted to be pivotally mounted by means of openings 36 thereof upon bearing portions of the drive axle, not shown, in known manner. It comprises in general a fixed mast section 40 which includes a pair of transversely spaced opposed channel members 42 of substantially C-shaped cross-section, to the rear flanges of which are secured trunnion plates 32, channel members 42 being arranged to receive an inner mast section 44 formed of two laterally spaced I-beams 46, the latter section being guide roller supported in mast section 40 and arranged for longitudinal movement relative thereto. A known fork carriage construction 48 includes generally a pair of fork tines 50 supported from a pair of vertically spaced fork bars 52 to which are connected for elevation in inner mast section 44 a pair of fork brackets 54 to each of which is mounted a pair of vertically spaced guide rollers 56 engaging the inner channels of I-beams 46. A bracket 58 extends rearwardly of each channel member 42 for connection to the rod ends of a pair of upright tilt cylinders, not shown, pivotally connected to the truck for tilting the upright forwardly and rearwardly on its front axle mounting, as is well-known.

Mast section 40 is cross-braced for rigidity at the rear side thereof by means of vertically spaced and transversely extending tie-bar members 60, 62, 64, and 66, braces 60 and 62 of which are relatively large C-shaped members, the flanges of which are notched at 67 to conform to the rear corner sections of channels 42 and secured, as by welding, to the web and rear flange portions of said channelse, as best shown in FIG. 4. Tie-bar or brace member 64 is secured to the rear flanges of channels 42 and is shaped to provide a rearwardly extending vertical space which allows the passage of tie-bar members secured to the rear flanges of I-beams 46, as will be described. Tie-bar 66 functions mainly as a supporting bracket for a hydraulic ram cylinder assembly 74 and is secured at its opposite ends to the rear flanges of channels 42, being formed with forwardly extending and biased strut members 68 and 70 supporting a partial ring 72 centrally of the lower end of the mast in which is mounted cylinder assembly 74. The lower mounting assembly bracket for ram cylinder assembly 74 is generally similar to the triple-stage ram cylinder mounting bracket 208, shown in perspective view in FIG. 12B, which is mentioned here to facilitate understanding of the similar support bracket structure of FIGS. 1–3.

Cylinder assembly 74 is of known construction and is best illustrated in FIG. 2 wherein it is shown in its collapsed position and in half longitudinal sectional view. A brief description of its function and operation will suffice. It comprises four concentric and telescopic tubes or cylinders, the inner tube member 76 being substantially the length of the collapsed mast, closed at the top by a cup-shaped insert 77, and mounted for limited pivotal movement at the bottom end thereof by means of a limited universal joint type mounting member 78 which is supported in the socket formed by partial ring 72 of cylinder support bracket 66 and in turn supporting the lower multi-stepped end 79 of the cylinder assembly, as best shown in section in FIG. 2. Circumferential ports 82, one of which is shown, are located in the wall of tube 76, and an L-shaped port 84 in the bottom of tube 76 is adapted to connect a hydraulic pressure system, not shown, to the ram assembly 74. An integral inner-outer tubular ram construction 86, 88 is adapted to function as a single telescopic ram member, tubular member 86 being also substantially the length of the collapsed mast, closed at the upper end above tube 76 and being removably connected in a manner to be described to the inner mast section 46 by an inverted generally L-shaped bracket 89. Tube 86 is secured at the bottom end thereof to outermost tube 88 by a member 90, tube 88 having secured at the top end thereof a collar 92. An intermediate tube member 94 carries at the top end thereof a cross-head and pair of transversely spaced sprockets 96, the tube 94 being telescoped within the annular space 98 formed between tubes 86 and 88, and the upper end portion of tube 94 being adapted to slide in sealing relation to tube 86 from the position illustrated in FIG. 2 to the upper end of the upright, at which location the cross-head is adjacent the horizontal leg of bracket 89 which has a circular opening 99 therein in registry with a projection 100 of tube 86 which is adapted to be secured to the bracket by a segmented ring assembly including a snap ring 101.

An upper tie-bar 102 of inner mast section 44 is secured centrally of the vertical leg of bracket 89 by four recessed threaded studs 106. Spaced vertically below tie-bar 102 are additional intermediate and lower tie-bar members 103 and 104 located adjacent outer mast tie-bars 62 and 64, respectively, when the upright assembly is collapsed. The inner mast section tie-bars are secured, as by welding, to the rear surfaces of the rear flanges of I-beam rails 46. A pair of transversely spaced lifting chains 108 are secured by anchor bolts 110 to an anchor plate 112 secured to outer tube 88, and thence reeved over sprockets 96 and connected at their opposite ends to anchor members 114 on fork bars 52. Tubes 88 and 94 are approximately one-half the length of the upright sections and include a pair of cooperating annular stop members 116, 116. Annular stop means 117, 117 are located radially inwardly of portion 90 of cylinder 86 and radially outwardly of inner cylinder 76, which stop members are actuated into abutment at and limit the maximum extension of the ram motor assembly. A plurality of circumferentially spaced ports 122 are formed in tube 86 so that pressure fluid may be conveyed through port 84 to fill and pressurize by way of ports 82 and 122 the interiors of the ram members for raising and lowering fork carriage 48 within mast section 44, and mast 44 relative to mast section 40.

The construction of the lift cylinder assembly and the effective areas of the various tubular members thereof is such that during operation intermediate tube 94 first actuates the fork carriage 48 to a full "free-lift" position wherein the fork carriage is located adjacent the top of the mast in collapsed position with cross-head 96 adjacent bracket 89, and in which position stops 116, 116 are in abutment and continued application of hydraulic pressure to the ram assembly actuates the inner mast section 46 and tubular members 94, 86, and 88 together along stationary inner tubular member 76 to a maximum elevation at which stop members 117, 117 abut as described above. The upright is designed to insure adequate retainment between the various mast sections at maximum elevation of the fork carriage. To lower the carriage to ground level, a reverse of the above sequence occurs when the pressure fluid filled ram motor assembly 74 is connected to a fluid reservoir on the truck allowing gravity forces to return the upright assembly to the collapsed position illustrated in FIG. 1.

It will be noted in the particular upright configuration illustrated in the drawings, which is similar to that described in detail in Patent 3,213,967, that the inner I-beams 46 are nested in channels 42 in such a manner that the forward flanges of the I-beams are disposed forwardly of the forward flanges of the channels, and the rear flanges of said I-beams are disposed within channels 42 and forwardly of the rear flanges of the channels. Upper and lower pairs of guide rollers 124 and 126, are mounted on corresponding pairs of stub shaft members 130, 130 which may be welded, or otherwise fixedly secured, to the webs of the nested pairs of I-beams and channels, respectively, for supporting the I-beam rails for extension and retraction in channel sections 42. Likewise, the upper and lower pairs of rollers 56, 56 may be mounted on similar stub shafts which are secured to fork brackets 54.

Each guide roller and shaft assembly is as shown in detail in FIG. 4A; it comprises a stub shaft 130 having a flanged end 132, the back surface 133 of which is preferably welded to the respective web sections of the I-beam and channel section rails, and to the fork brackets 54, as shown. Each roller, as shown, has outer roller portion 134 mounted on a ring of ball bearings 136, and an inner race 138 having a sliding fit with shaft 130 and readily mountable and demountable manually thereon. One or more shims 140 (one is shown in FIG. 4A) are ordinarily mounted on each shaft 130 between flanges 132 and the side of the roller inner race at the time of assembly in the upright so that the tightness or clearance in a lateral direction of the upright rails and of the fork carriage may be readily adjusted. In practice I prefer to use guide rollers which are slightly cocked or canted in opposite directions as described in detail in above-mentioned Patent 3,213,967. For the purpose of simplicity, however, they are shown here without such canting, having their axes of rotation normal to the web of the rail or fork bracket to which each shaft 130 is secured. In addition to the guide rollers, a pair of side thrust rollers 142, FIGS. 3 and 4, are connected to the carriage 52 and are adapted to roll along the outer edge portion of each forward flange of each inner I-beam member 46, said pair of side thrust rollers cooperating with the lower inner carriage support rollers 56 for preventing a tendency of the upright to spread apart or wedge when the load carriage is eccentrically loaded, and for resisting side thrust forces imposed upon the load carriage.

Cutouts 144 are provided in the upper corner portion of the forward flange of each channel beam member 42, and in the lower corner portion of the outwardly extending rearward flange of each I-beam member 46 (FIG. 4) so that relatively large diameter guide rollers 124 and 126 may be mounted on shafts 130 within the respective mast sections such that the rollers extend through the respective cutout flange portions with attendant advantages as described in said Patent 3,213,967. Cutouts 144 are relatively short in length (FIG. 4A) so that the guide rollers cannot bypass one another for assembly and disassembly, as is the case in the construction disclosed in above Patent 3,298,463, for example. Thus, as will be apparent to persons skilled in the art, a tertiary safety feature is provided which functions to prevent possible separation of the upright sections during operation in the event of a loss or shearing off for any reason of internal secondary safety stop members 150, which are secured, as by welding, to the rear outer corner portions of I-beam rails 46 in predetermined vertically spaced relation above lower rollers 126 and below upper rollers 124. A pair of additional safety stop members 152 and 154 are secured in overlapping relationship to each of fork brackets 54 and opposite side portions of tie-bar 102, respectively, to limit the maximum extension of the fork carriage in inner mast section 44.

As pointed out above, the internal stops of cylinder assembly 74 will in all ordinary circumstances limit maximum extension of the various mast parts, and the foregoing secondary safety stop members will not, in normal operation, be effective to limit upright extension. However, in the event that manufacturing specifications for location of certain upright parts are not adhered to, for example, it is possible that the inner mast of the upright and the fork carriage could be extended to an unsafe elevation, which the above-mentioned secondary safety stops are located to prevent. Stops 150 are adapted to abut upper rollers 124 in the event they should be required to function to limit mast extension. In the unlikely event that neither the primary nor secondary stops function for any reason, the aforementioned tertiary safety feature provided by abutment of rollers 124 and 126 will prevent disengagement of the inner mast section from the outer mast section.

Referring now to FIGS. 5 and 6, I will describe one method of manipulating the upright of FIGS. 1–4 to facilitate adjustment or replacement of rollers 124 and 126. In this embodiment, ram motor 74 is first operated to actuate fork carriage 48 to a full free-lift position, as shown in FIG. 5 and in phantom view in FIG. 1, in which position, it will be recalled, cylinder member 94 is located at the top of cylinder 86 so that cross-head 96 is adjacent to bracket 89 and internal stops 116, 116 are in abutment. As will be noted best in FIG. 2, the lower pair of studs 106 are located behind outer upper tie-bar 60, and are inaccessible with the inner mast section 44 fully collapsed, as is the case with the fork carriage in a full free-lift position. Ram motor 74 is therefore operated to actuate mast section 44 to a slightly elevated position, as in FIG. 5, in order to expose the lower pair of studs 106 above tie-bar 60, as shown, in which position the secondary stroke of the ram motor has elevated slightly the interconnected cylinders 86 and 88 on inner cylinder 76 through the abutment of stops 116, 116.

With the upright assembly located as in FIG. 5, a securing member, such as a strap, chain or any other suitable means, is used to secure the fork carriage to an inner mast section tie-bar which is at a lower elevation than the portion of the carriage to which it is secured. This is represented in FIGS. 5 and 6 by a chain 162 which is threaded through the upright around tie-bar 103 and lower fork bar 52 with minimum slack. After thus securing the inner mast section to the fork carriage the four studs 106 may be removed, thereby disconnecting bracket 89 from upper inner mast tie-bar 102. Inasmuch as bracket 89 comprises the only direct physical connection between inner mast section 44 and ram assembly 74, disconnection thereof enables the inner mast section to be lowered to a "negative lift" position, as in FIG. 6, wherein the ram cylinder 94 is lowered somewhat below its full free-lift position, as will be observed by comparing the elevation of fork carriage 48 in FIGS. 5 and 6, which also effects a lowering of the inner mast section therewith by chain 162. In thus lowering the inner mast below its normal fully collapsed position, tie-bars 102, 103 and 104 pass through the respective pockets or openings of C-shaped outer tie-bar members 60, 62 and 64, respectively. The capability of the inner tie-bars to pass through the outer tie-bars in either direction will be observed in FIGS. 5 and 6. It will be appreciated that in the above negative lift operation ram cylinder 86 is lowered to its collapsed or full free-lift position at which bracket 89 is located as in FIG. 6, and that primary ram cylinder 94 is lowered an additional amount on cylinder 86 which enables the inner mast section to be lowered therewith by chain 162 to the negative lift position illustrated in FIG. 6. In the latter position lower rollers 126 and upper rollers 124 become fully exposed.

It will be noted in FIGS. 1, 5 and 6 that the lift truck is shown with front wheels 14 located on a pair of short ramp members 160, the purpose of which is to elevate the upright assembly 30 an additional distance above floor level so that with the inner mast section lowered to a negative lift position there is sufficient space to enable the servicing of lower rollers 126, as will be apparent in viewing FIG. 6. In many upright constructions which are used with hard or cushion tyred lift trucks, there is insufficient vertical space in which to lower the inner upright sufficiently to completely expose the lower rollers for servicing. Any suitable means can, of course, be used to elevate the front of the truck for this purpose. Use of ramps 160 is exemplary of a simple means for providing such additional space. The use of larger pneumatic tires on lift trucks normally provides sufficient elevation of the upright above floor level to enable roller removal and adjustment without providing additional elevation as by ramps 160; see FIGS. 9 and 10 wherein the latter condition is represented.

The guide rollers 124 and 126, each comprising the assembly of FIG. 4A, are preferably manually mounted with a sliding fit on shaft 130, are held in position during operation of the upright between the webs of the respective mast rails, and are readily adjustable and/or replaceable manually by adding or subtracting shims 140 as required for upright lateral tightness, as aforesaid, and by manually sliding off and on each shaft 130 a new roller, all with the mast sections in the position shown in FIG. 6. Following roller replacement and/or adjustment, a reversal of the above procedure reconditions the upright for normal operation, as in FIGS. 1–3. That is, the mast section 4 is raised with carriage 48 from the FIG. 6 to the FIG. 5 position, at which studs 106 are replaced to reconnect bracket 89 and tie-bar 102. Chain 162 may then be removed, fork carriage 48 lowered, and the truck driven from ramps 160. It will be readily appreciated that complete roller servicing can be accomplished with little time and effort, that no extraneous equipment is required, such as overhead cranes, and the like, and that, as a consequence, the procedure can be implemented wherever the lift truck may be located.

It will also be appreciated that original assembly and adjustment of the upright by the manufacturer is greatly facilitated by this invention. Correct initial lateral adjustment of the mast at the factory is very important since normally the adjustment is not required to be altered for a high percentage of the operating life of the mast. Heretofore, as pointed out in general in the above section entitled "Background of the Invention," no really adequate solution to the problem had been devised. By means of my invention, both original factory assembly of mast sections and adjustment of guide rollers is greatly simplified in that the mast sections 40 and 44 may be assembled without any of guide rollers 124 or 126 mounted on shafts 130. Further, in the nested I-bear construction disclosed, shafts 130 of rollers 124 are displaced forwardly of shafts 130 of rollers 126 and, consequently, they may with facility be welded in position prior to mast section assembly, and be manipulated to readily bypass each other during such assembly.

The mast section 44 is telescoped into the mast section 40, during factory assembly, preferably with the mast sections in a horizontal position, to the negative lift position in FIG. 6 in which rollers 124 and 126 may be readily mounted by hand and adjusted for predetermined upright lateral tightnes by shims 140. It will be also noted that during assembly of the mast sections, stop members 150 are enabled to be welded in position prior to assembly of the mast sections, and to bypass upper shafts 130 on outer rails 42 during assembly, thus further facilitating the attachment of the various parts in the mast sections and the assembly of the mast sections. Ram assembly 74 is next mounted and connected to the various other upright components, and carriage 48 assembled and connected in the upright. The above procedure greatly simplifies and hastens factory assembly and adjustment of lift truck uprights over any procedure known heretofore.

FIGS. 7 and 8 illustrate a somewhat different method of manipulation of the upright than shown in FIGS. 5 and 6 for effecting the same result without actuating the carriage 48 to a full free-lift position. In FIG. 7 the fork carriage is shown actuated to a partial free-lift position in which the carriage is secured to the lower inner mast tie-bar member 104 by chain 162. By thus securing the carriage to the inner slide by chain 162 prior to full free-lift thereof, ram cylinder actuation to additionally elevate the carriage will also force premature operation of the secondary ram stroke well prior to abutment of stops 116, 116, thereby raising the I-beam mast section to the FIG. 7 position, which is the same as the FIG. 5 position thereof, in which studs 106 can be removed enabling the I-beam mast section to be thereafter lowered to the negative lift position of FIG. 8, the same as in FIG. 6, in which the guide rollers 124 and 126 may be serviced as previously described. A reversal of the steps of the foregoing procedure reestablishes the upright in full operating condition. While I prefer the method described with respect to FIGS. 5 and 6, the embodiment of FIGS. 7 and 8 is illustrated and described to indicate the versatility of my invention.

FIGS. 9 and 10 illustrate another embodiment of the invention wherein an overhead crane mechanism or chain fall, illustrated in the figures schematically by a pulley and cable assembly 164 and 166, is utilized for raising and lowering the inner I-beam section as an alternative to the use of chain 162 of FIGS. 5–8. Thus, prior to attachment of chain 166 the relationship of the various components of the entire upright assembly is established in FIG. 9 the same as in FIG. 5 wherein the secondary stroke of the ram assembly 74 has been actuated a small distance. Cable 166 or equivalent support means is then attached to tie-bar 102 laterally outwardly of abutment thereof with bracket 89, and studs 106 removed so that I-beam mast section 44 can be subsequently lowered by the pulley and cable while lowering the fork carriage to the position shown in FIG. 10, in which guide rollers 124 and 126 are exposed as in FIGS. 6 and 8 for adjustment and/or replacement. A reversal of the above procedure will, of course, return the upright assembly to its original operating condition, as in the other embodiments.

Yet another readily available means for manipulating the upright to carry out the invention hereof in an upright of the type shown in FIGS. 1–4 employs the use of a simple jack 170 or equivalent hoist device. While I have not shown such a device in conjunction with the upright of FIGS. 1–4, the manner of use thereof in carrying out the method of manipulation in such an upright will be readily apparent by reference to FIGS. 19 and 20. The latter figures show the manner of use of the jack in raising and lowering an inner I-beam section of the triple-stage upright of those figures, so that the upper and lower guide rollers are exposed for adjustment or replacement, as aforesaid. It will be apparent that the jack may be used as an external means for manipulating one or more telescopic mast sections for the purpose of the invention, and is broadly equivalent to the use of overhead support means such as pulley and cable 164 and 166 for this purpose. In the use of a jack or equivalent device 170, it may be necessary to use higher ramps than ramps 160 with cushion tyred lift trucks. In FIGS. 19 and 20 ramps 160 are shown in use with a pneumatic tyred lift truck, giving an overall greater height of the upright assembly above floor level so as to provide adequate room for jack 170 in manipulating inner mast section between the negative lift and raised positions shown in the latter figures.

It will be noted that upon detachment of bracket 89 from tie-bar 102, lift ram assembly 74 is capable of forward pivotal movement about its connection at 78 with lower bracket portion 72. In the embodiment of FIGS. 5 and 6 such forward pivotal movement is minimized inasmuch as the fork carriage is at its full-free-lift position. In order to protect ram cylinder 94 from possible damage it may be found desirable to place a pad or equivalent means over the center portion of the carriage against which the ram assembly can rest during manipulation of the upright parts. In the embodiment of FIGS. 7 and 8, the same procedure may be used as above in supporting the ram assembly, although further forward pivotal movement thereof would occur inasmuch as the carriage is only partially elevated in the collapsed mast. It may therefore be found desirable to, for example, secure a strap or equivalent means around the upper portion of the mast for supporting the cylinder against excessive pivotal movement during the period when bracket 89 is detached from stop 102. With respect to the embodiments disclosed in FIGS. 9 and 10 and referred to with regard to FIGS. 19 and 20, the fork carriage can be actuated either as shown in FIGS. 5 and 6 or in FIGS. 7 and 8. It should be also noted that in either of the embodiments of FIGS. 9 and 10 or FIGS. 19 and 20, it would be feasible to carry out the method without elevating any of the mast parts, including fork carriage 48 and cylinder 74, other than by outside means such as chain fall 154, 166, or jack 170. That is, the elevated position of the inner mast section 44 as shown in FIG. 9 could be accomplished by forcing premature elevation of cylinder 86 at which position studs 106 are removed, subsequent to which mast section 44 can be lowered to the FIG. 10 position by chain fall or jack, the guide rollers then serviced, and the above-procedure reversed to reposition the mast assembly in its normal collapsed position.

As will soon be apparent, my invention, both in the means and the methods utilized, is also applicable to triple-stage uprights, wherein the method of manipulation requires additional steps because of the additional upright section and guide rollers involved, although it utilizes the same basic concept as described above in respect of the upright of FIGS. 1–4.

In FIGS. 11–14 is disclosed a triple-stage upright of the nested or interlocking I-beam rail type, similar to that disclosed in FIGS. 1–4 except that a third or intermediate I-beam mast section is interposed between the inner and outer rail sections, and the upright is not of the full free-lift type but is a standard or partial free-lift upright wherein the fork carriage is elevated only a relatively short distance in the inner mast section before the inner mast section begins to telescope outwardly of the intermediate mast section. In FIGS. 11–14 parts which are similar to corresponding parts in FIGS. 1–4 have been similarly numbered with prime designators.

Figure 11:
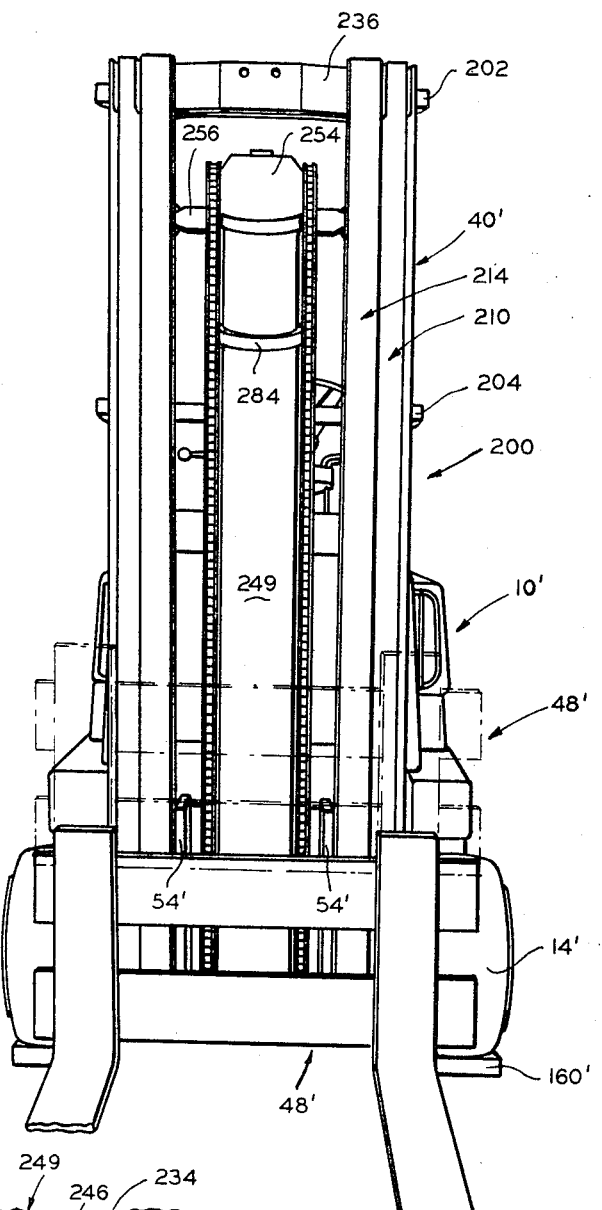
FIGURE 11 is a view similar to FIG. 1, but shows a triple-stage mast mounted on the truck.
Figure 12B:
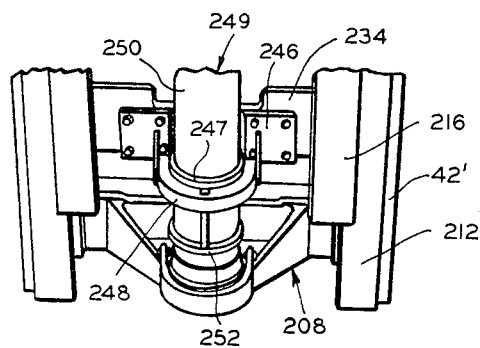
FIGURE 12B is a partial view in perspective showing the lower end of the mast of FIG. 12, and in particular the mounting structure of the lift ram motor in the mast.
Figure 12A:
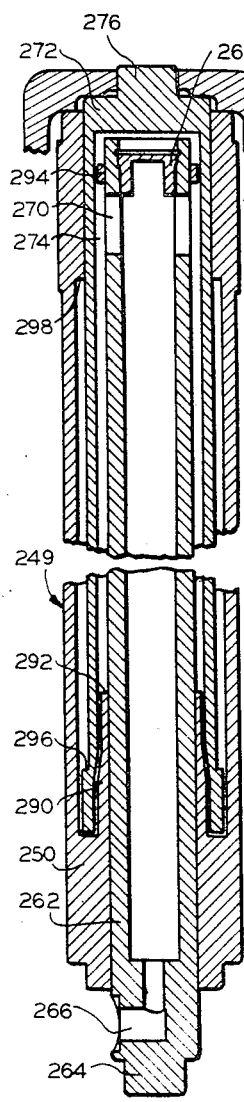
FIGURE 12A is a longitudinal sectional view of the telescopic lift ram motor of the mast of FIG. 12.
Figure 14:
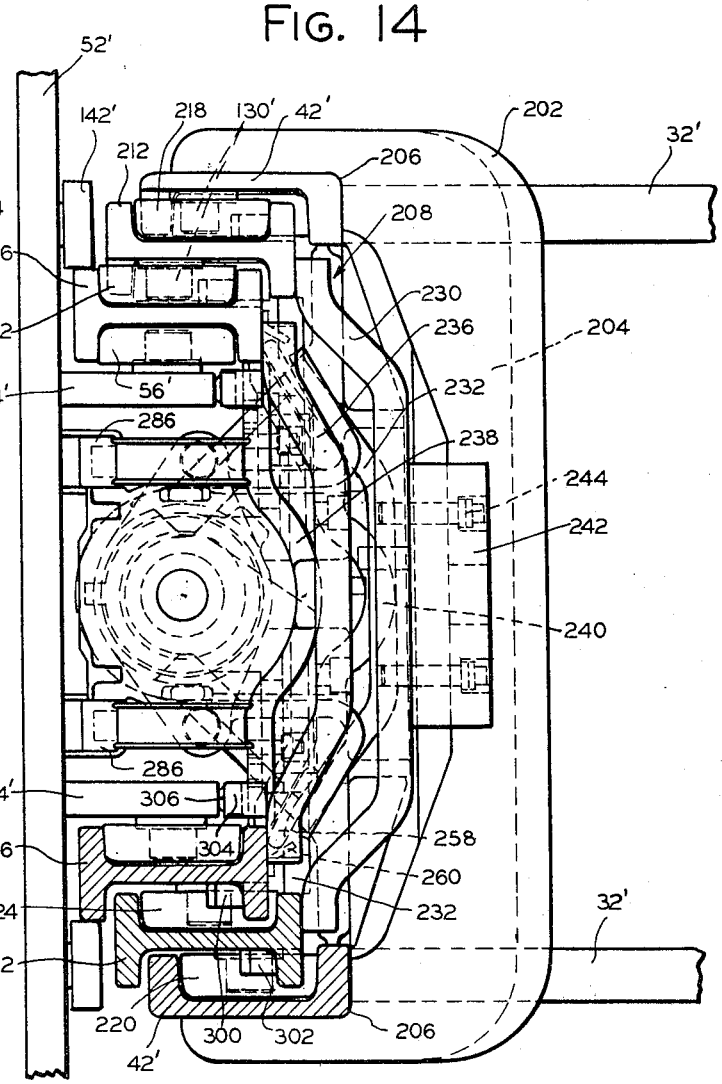
FIGURE 14 is an enlarged plan view in partial section of the mast of FIG. 12.

The lift truck of FIG. 11 is similar to the lift truck of FIG. 1, and parts thereof have not been numbered other than as related to the mast assembly. The free-lift position of fork carriage 48' just prior to outward telescoping movement of the inner mast section is represented in FIG. 11 in phantom outline. The mast assembly is designated generally by the number 200; it is mounted on bearings formed on the front drive axle which carry drive wheels 14' by transversely spaced trunnion means 32' connected to the rear flanges of a pair of transversely spaced outer channel rail members 42' which are cross-braced for rigidity at the rear thereof by means of vertically spaced and transversely extending tie-bar members 202 and 204 which are generally C-shaped in configuration and the flanges of which are notched at 206 to conform to the rear corner sections of channels 42'. A bottom tie-bar and ram cylinder support bracket is shown in FIG. 12B generally at numeral 208; it is secured to outer rails 42' and is similar to the corresponding bottom tie-bar and support bracket of FIGS. 1–4 which supports the ram motor assembly 74.

Outer mast section 40' is arranged to receive an intermediate mast section 210 formed of two laterally spaced I-beams 212, and mast section 210 is arranged to receive an inner mast section 214 formed of two laterally spaced I-beams 216. I-beam rails 212 are guide roller supported in channel rails 42' for longitudinal telescopic movement relative thereto by upper and lower pairs of guide rollers 218 and 220, respectively, each mounted on a stub shaft member 130', the same as in the mast of FIG. 1. Likewise, inner I-beam rails 216 are mounted for longitudinal telescopic movement relative to intermediate I-beam 212 on upper and lower pairs of guide rollers 222 and 224, respectively, each also mounted on a stub shaft 130', 130' secured adjacent the top of I-beam rails 212 and adjacent the bottom of rails 216. Fork carriage assembly 48' is mounted as previously on guide rollers 56' and fork bars 54' in the inner channel portions of I-beam rails 216 for elevation relative to rails 216. As will be readily observed from the figures, and particularly FIGS. 11–14, the interlocking or nested arrangement of intermediate and inner I-beam mast sections 210 and 214 relative to each other and to outer mast section 40' is similar to the corresponding mounting of inner mast section 44 in outer section 42 in FIGS. 1–4.

Intermediate rails 212 are interconnected by transverse, vertically spaced tie-bar or brace members 230, 232 and 234, and inner rails 216 are similarly interconnected by transverse tie-bars 236, 238 and 240. Upper tie-bar 236 is secured, as by welding, to the back flange surfaces of inner rails 216, whereas the middle and lower inner rail tie-bars 238 and 240 are secured to the inner edges of the rear flanges of I-beams 216. Likewise, upper tie-bar 230 of intermediate rails 212 are secured to the rear flange surfaces thereof, whereas the middle and lower tie-bars 232 and 234 are secured to the inner edges of the rear flanges of said rails. The various tie-bar members are suitably secured in the vertical spaces provided between the various rear flanges of the nested mast sections and are so formed that they are capable of bypassing one another, as required, in elevating and lowering operations, for roller replacement and servicing, as will become apparent as the description proceeds. A pair of transversely spaced inner rail stop members 241 are secured to tie-bar 240 by bolts 243, stop blocks 241 overlapping and being in abutment with intermediate mast section tie-bar 234 when inner mast section 214 is in a collapsed condition, thus preventing downward movement of the inner mast section below the other mast sections. A stop member 242 is secured by bolts 244 to tie-bar 230 and overlaps upper outer tie-bar 202. When the intermediate mast section 210 is collapsed it is supported in the position shown in FIGS. 1–4 by the abutment of stop member 242 with tie-bar 202. Lower tie-bar 234 has bolted thereto a bracket member 246, best seen in FIG. 12B, having a semi-circular ring 248 which, when the intermediate mast section is fully collapsed, abuts a collar 247 on the outer cylinder 250 of a telescopic ram motor assembly 249. A second collar 252 is located a predetermined short distance below collar 247 on tube 250 so that in operation of ram motor 249, outer cylinder 250 will travel upwardly through the lost motion provided between collars 247 and 252 before beginning to lift the intermediate mast section 210 following abutment of collar 252 with semi-circular ring 248, thus providing additional desirable retainment between the outer and intermediate rail sections at maximum fork height equal to the distance between collar 252 and ring 248, as is found desirable in uprights of the present design. This latter feature of operation will become more apparent following a description of ram motor 249, as shown in sectional schematic in FIG. 12A.

As pointed out above, ram motor assembly 249 has its lowermost end mounted in a ring or socket portion of tie-bar and support bracket 208, and the outer tube 250 thereof is further supported by collar 247 on semi-circular ring 248 of the intermediate mast section 210. In addition, the upper end portion of ram motor 249 is connected to a cross-head 254 which includes a pair of rearwardly extending stop blocks 257, to each of which is connected an outwardly extending bracket 256 having a biased roller 258 mounted at the opposite end thereof engaging one of a pair of short vertical tracks 260 which are secured to the upper rear flange portions of inner rails 216. Thus, ram motor 249 is supported at three locations vertically of the mast assembly, and supported at three locations vertically of the mast assembly, and as the cylinder assembly extends outwardly to elevate mast sections 210 and 214, the intermediate bracket 246, 248 is elevated with the intermediate mast section 210, thereby continuously proportionalizing the spacing between ram support brackets 256, 246 and 208 as the inner and intermediate rail sections telescope upwardly to maximum elevation with the ram assembly.

Ram motor 249 includes an inner fixed cylindrical member 262 having a bottom portion 264 adapted to be mounted in the socket of bracket 208 and an inlet port 266 adapted to be connected to a source of pressure fluid on the lift truck for operating the ram motor. The upper end of tube 262 is closed by a cup-shaped member 268. Hydraulic fluid flows through circumferential ports 270 in the wall of tube 262. A primary stroke cylinder member 272 is of generally inverted cup shape and is telescoped over cylinder 262 in annular space 274. The upper end projects upwardly at 276, which carries cross-head 254, on opposite sides of which are mounted a pair of sprockets or sheaves 278 having a pair of lifting chains 280 reeved thereon which are secured at the one ends by anchor member 282 to an anchor plate 284 secured to outer cylinder 250, and at the opposite ends to anchor assemblies 286 on lower fork bar 52'. An inner cylindrical portion 290 is integral with outer tube 250, as shown, and receives the lower end of cylinder 272 in the annular space formed thereby, said cylindrical portion 290 functioning as cylinder support and sealing means, and to provide an annular stop 292 which cooperates with an upper annular stop 294 at the upper end of cylinder 262 to limit maximum extension of the cylinder assembly. Cooperating annular stop portions 296 and 298 are formed on cylinders 272 and 250, respectively.

In operation of the ram motor 249, the intermediate cylinder 272 is first elevated when pressure fluid is communicated to the interior spaces of the assembly; it extends outwardly of cylinder 250 to actuate fork carriage 48' to a partial free-lift position along inner mast section 214 by means of lifting chains 280, until block members 257 of cross-head 254 engage upper tie-bar 236. Further extension of cylinder 272 elevates inner mast section 214 in intermediate mast section 210 and fork carriage 48' in mast section 214 at a 2:1 movement ratio until full extension of cylinder 272 relative to cylinder 350 causes engagement of stop members 296 and 298, following which the continued application of pressure fluid extends cylinders 250 and 272. This latter action first causes lost motion of cylinder 250 relative to intermediate mast section 210 as cylinder 250 moves upwardly to engage collar 252 with ring 248 (FIG. 12B), whereupon the intermediate mast section 210 is elevated with inner section 214 until maximum elevation of the mast sections and fork carriage is reached. At maximum elevation of the ram motor stops 292 and 294 are in abutment, it being noted that at such time as the intermediate mast section 210 begins to elevate, fork carriage 48' is located at its uppermost position relative to inner mast section 214 and no further elevation can occur since both ends of lifting chain 280 are at such time being elevated together at the same rate with outer cylinder 250. A reverse of the foregoing operation of the ram motor occurs when control valve means, not shown, is operated to release pressure fluid from the ram motor and return the mast to the position of FIG. 11.

Internal safety stop members 300 and 302 are secured in the rear corner portions of each I-beam rail 216 and 212, respectively, for a similar purpose as described in regard to the mast construction of FIGS. 1–4, viz, in the event of any malfunction which would permit extension of either mast section beyond that normally permitted by the operation of ram motor 249, the latter stop members would engage the respective pairs of upper guide rollers 222 and 218, such stop members being located a predetermined distance above the lower guide rollers as best shown in FIG. 12. Maximum elevation of fork carriage in inner mast section 214 is limited by overlapping stop members 304 and 306 secured to opposite side portions of tie-bar 236 and to the rear edge portions of fork brackets 54', respectively.

In carrying out my invention, I have devised a combination structure which enables the parts of upright 200 to be manipulated in various ways and in such a manner as to enable it to be assembled by the manufacturer, and all guide rollers thereof to be replaced or adjusted either at the factory or in the field in a simple and efficient manner. A preferred method of thus manipulating the upright of FIGS. 11–14 is illustrated in FIGS. 15–18. First, it will be noted that the front end of the cushion or solid tyred truck is shown somewhat elevated on ramps 160' for the reasons described before in connection with the embodiment of FIGS. 1–4. In the embodiment of FIGS. 11–14, a pneumatic tyred truck will ordinarily provide sufficient ground clearance to avoid the necessity of using ramps 160', as shown in the embodiment of FIGS. 9 and 10.

In FIG. 15, the fork carriage has been elevated with the inner rails 216 as shown by ram cylinder 272 in order to facilitate accessibility of stop members 241 on lower inner rail tie-bar 240, and to raise the fork carriage out of the vicinity of the lower end of the upright in order that it may be secured in an elevated position by means of a chain, cable, or the like which facilitates access to the guide rollers. In pneumatic tyred trucks it is not required ordinary to raise and secure the fork carriage in an elevated position inasmuch as there is sufficient ground clearance to enable guide roller replacement and adjustment even though the carriage is in a lowered position. In uprights of certain design with solid tyred trucks there is insufficient room for access to the guide rollers with the carriage down, which exemplary condition is illustrated in FIGS. 15–18 wherein the fork carriage is shown secured to the outer fixed rails 42' by a chain or other securing member 310. As will be noted in FIG. 15, intermediate rails 212 remain collapsed in outer rails 42' with stop member 242 in abutment with upper outer tie-bar 202. With the inner rails elevated partially by the primary stroke of the ram motor, stop blocks 241 are detached from tie-bar 240, as shown. It may be found convenient to tilt the upright assembly 200 forwardly on trunnions 32', which increases the accessibility of stops 241. Bracket member 248 is next detached from the lower tie-bar 234 of intermediate rails 212 so that it will not interfere with bypassing tie-bar 240 to the position shown in FIG. 16. It may be found desirable for convenience of access to bracket 248 to tilt the upright rearwardly on trunnions 32'.

With stop members 241 and bracket 248 detached from the respective tie-bars, the ram cylinder is next lowered from its elevated FIG. 15 position to the negative lift position of FIG. 16 in which the inner rails 216 are at ground level between wheels 14' and in which both upper and lower guide rollers 222 and 224 and are exposed, as shown. It will be noted that with the aforementioned stops 241 and bracket 248 removed said negative lift of the inner mast section is available since the only vertical support thereof results from the abutment between upper tie-bar 236 and block members 257 on the cross-head of the ram motor, which when lowered below the free-lift position thereof carries therewith inner mast 214 to the FIG. 16 position. In the latter position, tie-bar 240 is located partially below tie-bar 234, and tie-bar 238 is located below tie-bar 232, while the fork carriage remains secured in an elevated position by member 310. Guide rollers 222 and 224 can now be readily adjusted and/or replaced in accordance with the previous description of FIGS. 5 and 6, for example.

Figure 17:
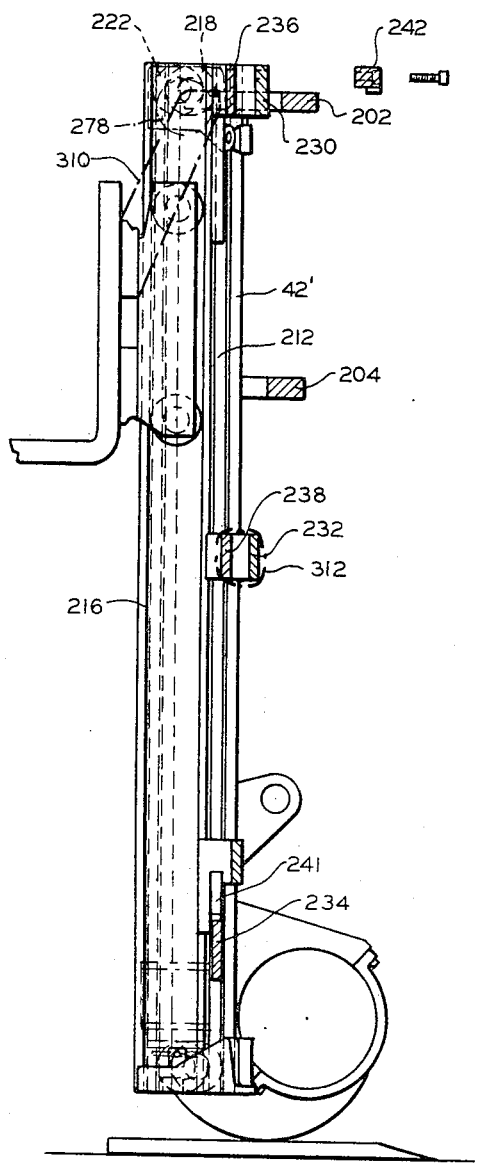
Figure 18:
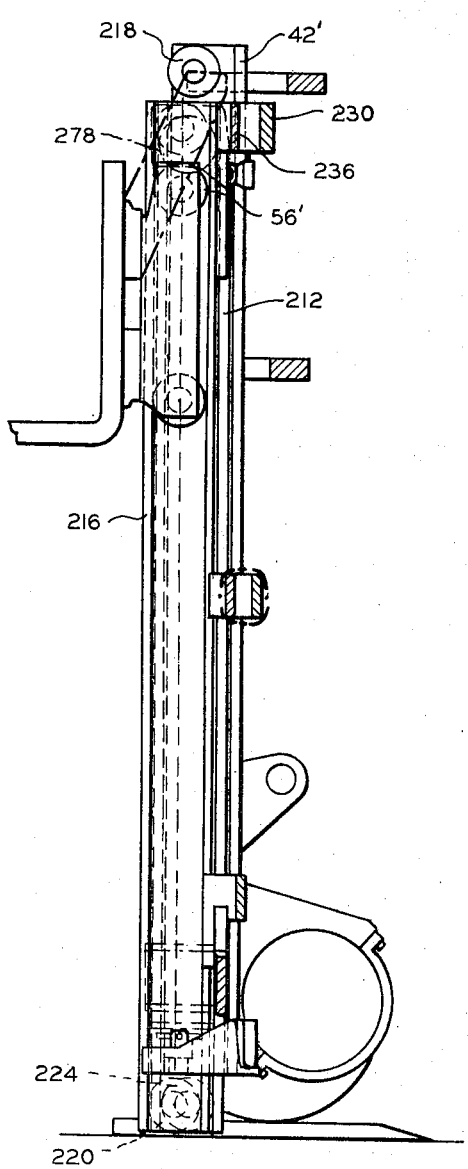

Following servicing of rollers 222 and 224, ram cylinder 272 is preferably elevated sufficiently to allow stops 241 to be reconnected to tie-bar 240 and then lowered to the normal collapsed position of the mast sections as shown in FIG. 17, but with the fork carriage still secured by member 310 to the outer mast section. In this position tie-bars 232 and 238 of the intermediate and inner mast sections, respectively, are side-by-side, as shown in FIG. 17, and are preferably secured together, as by a rope or chain 312, following which ram cylinder 272 is elevated slightly so that upper stop block 242 may be disconnected from the intermediate mast tie-bar 230, thereby operatively disconnecting tie-bar 230 from outer mast tie-bar 202 and the intermediate mast section from the outer mast section. Lowering ram cylinder 272 again to the position of FIG. 16 will then effect a lowering together of the inner and intermediate mast sections to the negative lift position shown in FIG. 18, thereby exposing the lower outer guide rollers 220 of intermediate rails 212 and the upper guide rollers 218 of outer rails 42'. In this position it is noted that upper intermediate tie-bar 230 is located below upper outer tie-bar 202 and that bracket 248 remains detached to permit the aforesaid lower of the inner and intermediate mast sections to the FIG. 18 position. Guide rollers 218 and 220 may thereupon be serviced as required, whereupon the inner and intermediate mast sections are elevated again by cylinder 272 slightly above the outer mast section so that stop member 242 may be reconnected to tie-bar 230 thereby reestablishing the normal collapsed position of the intermediate mast section relative to the outer mast section. Member 312 may then be detached from tie-bar 232 and 238 and the inner mast section elevated to the FIG. 15 position, for example, wherein ram motor bracket 248 is secured to tie-bar 234 and chain 310 is detached from the fork carriage and outer mast section, whereupon the ram motor may be lowered to the FIG. 12 position in which the fork carriage is at ground level and the mast fully collapsed in normal operating condition with all or any combination of mast section guide rollers now serviced and/or replaced, as required. It is noted that the only extraneous equipment used were securing members 310 and 312, and ramp 160', and that relatively little time, effort and skill is required to carry out the method.

It will be appreciated that a number of different methods or procedures may be utilized, all within the basic concept of my invention; the foregoing description of a preferred manner of manipulation of a triple-stage upright of the type disclosed is intended to be exemplary only. For example, the mast sections of the triple-stage upright may be manipulated in the manner generally described above by means of an overhead crane or chain fall, such as is disclosed schematically in FIGS. 9 and 10 in respect of the two-stage upright, or they may be manipulated for the above-stated purposes by jack means, such as shown in FIGS. 19 and 20. In view of the previous description, it is believed that it will be apparent to persons skilled in the art how the method of the invention is implemented in the triple-stage upright by means of the chain fall of FIGS. 9 and 10 or the jack of FIGS. 19 and 20, without resorting here to further detailed description. Briefly, however, exemplary alternate methods as suggested in FIGS. 9, 10, 19 and 20 may be as follows: Secure the inner mast section 214 to the chain fall of FIGS. 9 and 10 or support by a hoist or jack, as in FIGS. 19 and 20, remove the ram motor bracket 246, 248, remove stop members 241, and lower the inner mast sufficiently to replace or adjust lower inner and upper intermediate guide rollers. Then support intermediate mast 210 by chain fall, hoist or jack, replace stop 241 and detach stop 242, and then lower the intermediate rail and replace or adjust the lower intermediate and the upper outer guide rollers. Then, raise both inner and intermediate rails by the chain fall or jack and replace stop 242 and bracket 248. In the above briefly described procedure it will be noted that it is unnecessary to operate ram motor 249 either to lift and lower the inner and intermediate mast sections, or to raise and lower the fork carraige. Likewise, it is unnecessary to secure the fork carraige in an elevated position by member 310, it being assumed that the trunk is blocked above the floor so that the guide rollers will be exposed. Likewise, it is unnecessary to secure together tie-bars 232 and 238 by a member 312 inasmuch as external support of the intermediate mast section, such as by chain fall or jack, will lower it with the inner mast section together to expose the lower intermediate and upper outer guide rollers following reconnection of stop members 241. Thus, if other service work is being done on the truck at the same time which does not permit operation of the ram motor 249, for example, the guide rollers can be serviced without additional "down time" of the lift truck.

The basic structure and method of my invention can obviously be used in uprights of varying configurations and types, the particular upright requirements involved dictating the resulting design, including the number, location and design of tie-bars, stops, ram support brackets, ram motor elements, and the like. It is intended that all such variations and equivalents thereof fall within the scope of the present invention. The embodiments of my invention described in detail above are intended to be exemplary in character only, and this disclosure is intended for purposes of illustration and not as a limitation of the scope of the invention. Numerous variations and modifications may be made to suit different requirements, and other changes, substitutions, additions and omissions may be made in the construction and arrangement of the parts, and in the method of manipulation of the parts, without necessarily departing from the scope of the invention.

As a result, it is not my intention to be limited to any particular form of the invention herein illustrated and described except as may appear in the claims appended.

I claim:

1. A mast assembly for lift trucks comprising an outer channeled mast supported from the truck, an inner channeled mast mounted for elevation on the outer mast, roller means supporting the inner mast on the outer mast including roller means mounted on the outer lower end portion of the inner mast and engaging the adjacent channels of the outer mast, load engaging means mounted for elevation on the inner mast, hydraulic motor means for elevating the inner mast relative to the outer mast and the load engaging means relative to the inner mast having a first inner cylindrical element connected to the upper end portion of the inner mast and a second outer concentric cylindrical element shorter than the first cylindrical element, moveable upwardly thereon and operatively connected to the load engaging means for elevating the latter to a free-lift position in the inner mast, means normally connecting a portion of the motor means to the inner mast manipulatable to detach the inner mast from the motor means, and means for lowering the inner mast to a negative lift position in order to expose said lower roller means when the inner mast is disconnected from the motor means.

2. A mast assembly as claimed in claim 1 wherein said means for lowering the inner mast to said negative lift position includes means for connecting the inner mast to the load engaging means.

3. A mast assembly as claimed in claim 1 wherein said load engaging means is actuable in the inner mast to a full freelift position by said outer cylindrical element, from which position with said securing means disconnected from said inner cylindrical element the inner mast may be lowered with said outer cylindrical element to said negative lift position.

4. A mast assembly as claimed in claim 1 wherein each of said outer and inner masts comprises a vertically extending and transversely spaced pair of channeled members and a transversely extending brace member connecting the members of each said pairs of members, said normal connecting means being secured to the brace member of the inner mast, said pair of inner mast members including outwardly extending flange portions extending into the outer mast channel members, and upper roller means mounted on the upper end portions of the outer mast members for engaging said flanges, said upper roller means being also exposed when the inner mast is in said negative lift position.

5. A mast assembly as claimed in claim 4 wherein said outer mast brace member has a generally C-shaped configuration and said inner mast brace member is adapted to pass downwardly through the opening of the C-shaped member when said connecting means disconnects the inner mast from the motor means.

6. A mast assembly as claimed in claim 1 wherein the load engaging means is elevatable to a full free-lift position by the motor means, and means connected to the inner mast and the load engaging means for lowering the inner mast to said negative lift position with lowering movement of said load engaging means following disconnection of the inner mast from said inner cylindrical element.

7. A mast assembly for lift trucks comprising a first pair of channeled mast members supported from the truck, a second pair of channeled mast members mounted inwardly of the said first pair for elevation thereon, a tie-bar connecting in fixed spaced relation said second pair of mast members and secured to the rear flanges thereof, roller means supporting the second mast members on the first mast members including lower roller means mounted adjacent the outer lower ends of the second pair of mast members and engaging the adjacent channels of the first pair of mast members, a telescopic lift ram assembly mounted in the mast for elevating the second mast members on the first mast members including inner and outer concentric cylindrical ram members, load engaging means mounted for elevation on said second pair of mast members and operatively connected to said outer cylindrical ram member for elevation therewith, means securing said tie-bar to said inner cylindrical member, said means being detachable from said tie-bar for permitting said second pair of mast members and said tie-bar to be lowered to a negative lift position for exposing said lower pair of roller means, said tie-bar being located rearwardly of the upper end of said inner cylindrical member for such negative lift movement.

8. A mast assembly for lift trucks comprising a two-section load lifting frame wherein said sections are in telescoping relation with one another, one section having a pair of laterally spaced channeled members opening inwardly, each member having forward and rearward flange portions, the second section having a pair of laterally spaced I-shaped members nested within the first section such that one end flange of each I-shaped member is disposed forwardly of the forward leg portion of the adjacent channeled member and the other end flange is disposed inwardly of the adjacent channeled member, a first roller mounted in the upper end portion of each outer channeled member and a second roller mounted in the bottom end portion of each I-beam member, said rollers supporting said second section for telescoping movement on said first section, a transverse tie-bar securing in fixed spaced relation said I-beam members, load engaging means mounted for elevation on said second section, lift motor means mounted in the upright having a first cylindrical ram member substantially the length of said second section and a second outer cylindrical ram member concentric with the first ram member and having a length substantially one-half of said second section connected to said load engaging means for elevating the latter to a full free-lift position in said mast assembly, means normally connecting the first cylindrical ram member to said tie-bar, said latter means being adapted to disconnect said tie-bar from said first cylindrical member, said second section being movable to a negative lift position relative to said first section when so disconnected to expose said first and second pairs of rollers for servicing.

9. A mast assembly as claimed in claim 8 wherein means is adapted to connect the second section to the load engaging means for lowering the second section to said negative lift position following disconnection of said tie-bar to said first cylinder means.

10. A method of servicing the guide rollers of a lift truck upright having an inner mast section mounted for extension and retraction in an outer mast section, the inner mast section including guide roller members mounted on lower opposite side portions thereof supporting it in the outer mast section, and a multiple cylinder lifting ram for raising and lowering the inner mast section in the outer mast section and for elevating a load engaging means in the inner mast section, the lifting ram having an inner cylindrical member substantially tne length of the upright and secured to a tie-bar which connects opposite sides of the upper end of the inner mast section, a relatively short outer cylindrical member of said lifting ram being adapted to elevate the load engaging means to a full free-lift position on the inner mast section, comprising the steps of disconnecting the tie-bar from the connection thereof to the inner cylindrical member, and lowering the inner mast section to a negative lift position wherein the lower roller means are exposed for servicing.

11. A method as claimed in claim 10 comprising the additional steps of elevating the load engaging means to a free-lift position, connecting the load engaging means to the inner mast section for supporting the latter when it is disconnected from the inner cylindrical member, said inner mast section being thereupon movable downwardly with the load engaging means while disconnected as aforesaid.

12. A method as claimed in claim 10 comprising the additional steps of supporting the inner mast section by other means prior to disconnection thereof from said inner cylindrical member, said inner mast section being thereupon movable to said negative lift position without actuation of the load engaging means.

13. A method as claimed in claim 10 comprising the additional steps of actuating the load engaging means beyond its full free lift position, supporting the inner mast means in a vertical direction, disconnecting the tie-bar from the inner cylindrical member, and lowering the inner mast to said negative lift position.

14. A mast assembly for a lift truck comprising an outer channeled mast mounted from the truck, an intermediate channeled mast mounted for elevation on the outer mast, an inner channeled mast mounted for elevation on the intermediate mast, roller means supporting the inner mast on the intermediate mast and the intermediate mast on outer mast including lower roller means mounted on the outer lower end portions of the inner and intermediate masts engaging the adjacent channels of the intermediate and outer masts, respectively, means normally supporting the inner mast in a vertical no-lift position manipulatable to enable the inner mast to be lowered to a negative lift position in which the lower inner mast roller means are exposed, and means normally supporting the intermediate mast in a no-lift position manipulatable to enable the intermediate mast to be lowered to a negative lift position in which the lower intermediate mast roller means are exposed.

15. A mast assembly as claimed in claim 14 wherein transverse tie-bar means connect opposite side portions of each mast and are so positioned relative to each other that said inner mast vertical support means is connected to an inner mast tie-bar and supports the inner mast from an intermediate mast tie-bar, and said intermediate mast vertical support means is connected to a tie-bar of the intermediate mast and supports the latter mast from an outer mast tie-bar.

16. A mast assembly as claimed in claim 14 wherein the vertical support means for the inner mast supports the latter from the intermediate mast and the vertical support means for the intermediate mast supports the latter from the outer mast.

17. A mast assembly as claimed in claim 15 wherein said vertical support means comprise stop means mounted on and detachable from tie-bar means of the inner and intermediate masts for supporting the latter from the intermediate and outer masts, respectively, when in secured position, and permitting said inner and intermediate masts to be lowered to said negative lift positions when detached.

18. A mast assembly as claimed in claim 14 wherein means is provided for lowering together said inner and intermediate masts to said negative lift position for exposing the lower roller means of the intermediate mast.

19. A mast assembly as claimed in claim 14 wherein lift motor means is mounted in the mast assembly for elevating the inner and intermediate masts as aforesaid, said lift ram assembly being actuated to first support the inner mast and then to lower it to said negative lift position subsequent to manipulation of the inner mast vertical support means to a non-supporting condition.

20. A mast assembly as claimed in claim 14 wherein said roller means also include upper roller means mounted on and adjacent the inner upper end portions of the intermediate and outer masts for supporting the inner and intermediate masts, respectively, said upper intermediate roller means being exposed when the inner mast is lowered to a negative lift position and said upper outer roller means being exposed when the intermediate mast is lowered to a negative lift position.

21. A mast assembly as claimed in claim 15 wherein said tie-bar means are so constructed and arranged in relation to each other on each of certain of the masts that during lowering of the intermediate mast to said negative lift position a tie-bar thereof is lowered through an opening of and below an outer mast tie-bar.

22. A mast assembly as claimed in claim 21 wherein said vertical support means of the inner mast comprises detachable stop means connected to the inner mast tie-bar and adapted to overlap the intermediate mast tie-bar, and said vertical support means of the intermediate mast comprises a detachable stop means connected to the intermediate mast tie-bar and adapted to overlap the outer mast tie-bar, each of said stop means when detached from the respective tie-bars permitting the respective inner and intermediate masts to be lowered to said negative lift position.

23. A mast assembly as claimed in claim 19 wherein said lift motor means includes a plurality of concentric telescoped cylindrical ram members, one of which is connected to the intermediate mast, the connection being disconnected when one of said masts is lowered to said negative lift position.

24. A mast assembly as claimed in claim 14 wherein load engaging means is mounted in the inner mast for elevation thereon, and means for supporting the load engaging means in an elevated position during movement of said inner and intermediate masts to said negative lift positions.

25. A mast assembly as claimed in claim 14 wherein said lower roller means are mounted on shaft members having a fixed connection with the respective portion of each mast to which it is secured, said roller means being readily manually removable from respective ones of said shaft means for adjustment, servicing or replacement when the inner and intermediate masts are successively located in said negative lift positions.

26. A mast assembly as claimed in claim 15 wherein said tie-bars are secured to rear flanges of the opposite sides of each of said masts, the upper tie-bar of the outer mast having a generally C-shaped configuration through the pocket of which is adapted to pass the upper tie-bar of the intermediate mast when it is lowered to a negative lift positoin, said latter tie-bar also having an open pocket through which is adapted to pass the upper tie-bar of the inner mast when it is lowered to a negative lift position.

References Cited

UNITED STATES PATENTS

| 2,936,047 | 5/1960 | Quayle | 187—9 |
| 3,252,545 | 5/1966 | Quayle | 187—9 |

RICHARD E. AEGERTER, *Primary Examiner.*

H. C. HORNSBY, *Assistant Examiner.*

U.S. Cl. X.R.

187—95

UNITED STATES PATENT OFFICE
CERTIFICATE OF CORRECTION

Patent No. 3,433,324

March 18, 1969

Richard F. McIntosh

It is certified that error appears in the above identified patent and that said Letters Patent are hereby corrected as shown below:

Column 2, line 7, "3,321,047" should read -- 3,231,047 --. Column 4, line 21, "channelse" should read -- channels --. Column 7, line 73, "4" should read -- 44 --. Column 10, lines 60 and 61, cancel "in outer section 44". Column 11, lines 47 and 48, cancel "and supported at three locations vertically of the mast assembly,"; line 70, "member" should read -- members --. Column 13, line 1, "ordinary" should read -- ordinarily --; line 66, "lower" should read -- lowering --. Column 14, lines 46 and 47, "carraige" should read -- carriage --; lines 47 and 48, "carraige" should read -- carriage --; line 49, "trunk" should read -- truck --.

Signed and sealed this 14th day of April 1970.

(SEAL)
Attest:

Edward M. Fletcher, Jr.

Attesting Officer

WILLIAM E. SCHUYLER, JR.

Commissioner of Patents